(12) United States Patent
Pfundstein

(10) Patent No.: US 6,445,920 B1
(45) Date of Patent: *Sep. 3, 2002

(54) VIRTUAL PRIVATE NETWORK FOR MOBILE SUBSCRIBERS

(75) Inventor: Matthias Pfundstein, Stuttgart (DE)

(73) Assignee: Alcatel N.V., Rijswijk (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/375,690

(22) Filed: Aug. 17, 1999

Related U.S. Application Data

(62) Division of application No. 08/679,015, filed on Jul. 12, 1996, now Pat. No. 6,029,067.

(30) Foreign Application Priority Data

Jul. 12, 1995 (DE) ......................................... 195 25 363

(51) Int. Cl.⁷ ................................................. H04Q 7/20
(52) U.S. Cl. ........................ 455/426; 455/433; 455/463
(58) Field of Search ................................. 455/426, 432, 455/433, 435, 461, 463, 416, 414, 445, 518, 519, 554, 555

(56) References Cited

U.S. PATENT DOCUMENTS

| | | | | |
|---|---|---|---|---|
| 5,337,344 | A | 8/1994 | Alvesalo ...................... | 455/926 |
| 5,345,502 | A | 9/1994 | Rothenhöfer ................ | 379/207 |
| 5,557,655 | A | 9/1996 | Lantto .......................... | 379/58 |
| 5,594,777 | A | 1/1997 | Makkonen et al. ........... | 379/58 |
| 5,619,552 | A | 4/1997 | Karppanen et al. .......... | 379/60 |
| 5,734,699 | A | 3/1998 | Lu et al. ....................... | 379/58 |
| 5,818,824 | A * | 10/1998 | Lu et al. ....................... | 455/552 |
| 6,029,067 | A * | 2/2000 | Pfundstein .................... | 455/426 |

FOREIGN PATENT DOCUMENTS

| | | |
|---|---|---|
| DE | 36 39 956 A1 | 5/1988 |
| DE | 42 32 862 C1 | 3/1994 |
| DE | 42 40 249 C1 | 5/1994 |
| DE | 44 15 734 | 2/1995 |
| EP | 518 344 A2 | 12/1992 |
| WO | 94-26073 A1 | 11/1994 ............ H04Q/7/04 |

OTHER PUBLICATIONS

Buckman, "Revenue Opportunities for GSM Network Operators," *Mobile Communications Int'l*, Jun. 1995, pp. 39–42.

Siemens AG, "D900 Mobile Communication System," System Description SYD A30808–x3231–x—2–7618, Siemens AG, Munich 1992, pp. 9 & 21.

Rüdiger Sellin [Swiss PTT], "Management Privater Telekommunikationsnetze," [Management of Private Telecomm Networks] *NTZ*, vol. 7, 1995, pp. 26–31.

* cited by examiner

Primary Examiner—Lee Nguyen

(57) ABSTRACT

To install a virtual private network (VN) within a given mobile-radio network (MRN), a facility is proposed which is connected to the base stations (BS) and controls the establishment and release of calls between mobile subscribers (MS1 ... MSX) assigned to the coverage area of the base stations, and a data base (HLR) connected to the facility, which contains a subscriber data set (DS) for each of said mobile subscribers with a first logic data set (LDS) for registering them as subscribers of the mobile-radio network. Each of some of these mobile subscribers (MS1, MS2, MS3) has a second logic data set (LDS-VN) for registering them as subscribers of a virtual private network. In this way, in addition to the data set (LDS) allowing access to the mobile-radio network (MRN) as such, the invention adds to the subscriber data set in the existing data base (HLR) a further data set (LDS-VN), which enables a mobile subscriber to access a virtual private network (VPN). Essentially this only requires taking steps in the mobile-radio software area, whereby the installation of one or several virtual private networks can be very easily accomplished. The implementation of an intelligent network which is superimposed on the mobile-radio network can be omitted.

3 Claims, 2 Drawing Sheets

VIRTUAL PRIVATE NETWORK FOR MOBILE SUBSCRIBERS

This application is a divisional of U.S. Ser. No. 08/679,015, filed Jul. 12, 1996, now U.S. Pat. 6,029,067, issued Feb. 22, 2000.

TECHNICAL FIELD

The invention concerns a mobile-radio network, a facility and a device therefor.

BACKGROUND OF THE INVENTION

The article "Revenue opportunities for GSM network operators" by G. Buchman, on pages 39 to 42 of the magazine "Mobile Communications International", issue Jun. 23, 1995, (obtainable from MCI Sales, 3–6 Kenrick Place, London W1H 3FF Great Britain) describes a mobile-radio network that contains virtual private networks for mobile subscribers. The described mobile-radio network is structured according to the GSM (Global System for Mobile Communications) standard, and contains at least one base station for servicing a radio cell and a device for establishing and releasing calls between two mobile subscribers and a fixed network subscriber (see the figure on page 40 therein). So-called virtual private networks can be installed in the mobile-radio network described therein, by forming groups in which different mobile subscribers are logically assigned to each other. Each private network comprising such a group is also termed in the above article as a virtual private branch exchange having its own call directory. Mobile subscribers can access the private branch exchange by dialing a four-digit number and make cost-effective calls within their group, meaning within their virtual private network. The above article does not describe how such a virtual private network can be arranged for mobile subscribers within the mobile-radio network.

U.S. Pat. No. 5,345,502 describes the installation of virtual private networks within a mobile-radio network. In that case a virtual private network is constructed with the aid of an intelligent network (see figure therein). The intelligent network contains so-called service control points INSCP1 and INSCP2, which are connected to exchanges PISDN1 or PISDN2, meaning elements which must be additionally installed in the existing mobile-radio network, thus requiring the use of additional hardware and software.

DISCLOSURE OF INVENTION

It is the object of the invention to equip a mobile-radio network of the kind described in the beginning with at least one virtual private network for mobile subscribers, by using facilities and devices that already exist in the mobile-radio network.

According to a first aspect of the. present invention, a mobile-radio network comprising at least one base station, a facility connected therewith for controlling an establishment and release of calls between mobile subscribers assigned to the coverage area of the at least one base station, and a data base connected to the facility, is characterized in that the data base contains for each of said mobile subscribers a first subscriber data set having a first logic data set associated therewith for registering said mobile subscribers as subscribers of the mobile-radio network, and that the subscriber data sets for at least some of said mobile subscribers each have a second logic data set associated therewith for registering them as subscribers of a virtual private network.

According to a second aspect of the present invention, a facility which is connectable to at least one base station within a mobile-radio network and which controls an establishment and release of calls between mobile subscribers assigned to the coverage area of the at least one base station, is characterized by a data base which contains for each of said mobile subscribers a subscriber data set having a first logic data set associated therewith for registering said mobile subscribers as subscribers of the mobile-radio network and having a respective second logic data set associated therewith for each of at least some of said mobile subscribers for registering the latter as subscribers of a virtual private network.

According to a third aspect of the invention, a data base connectable within a mobile-radio network to a facility which is connected to at least one base station and which controls an establishment and release of calls between mobile subscribers assigned to the coverage area of the at least one base station, is characterized in that the data base contains for each of said mobile subscribers a first subscriber data set having a first logic data set associated therewith for registering said mobile subscribers as subscribers of the mobile-radio network, and that the subscriber data sets for at least some of said mobile subscribers each have a second logic data set associated therewith for registering them as subscribers of a virtual private network.

Accordingly, the mobile-radio network contains a facility that is connected to the base stations, which controls the establishment and release of calls between mobile subscribers assigned to the coverage area of the base stations, and a data base that is connected to the facility, which for each of said mobile subscribers contains a subscriber data set having a first logic data set associated therewith for registering them as subscribers of the mobile-radio network, and having a respective second logic data set associated therewith for some of these mobile subscribers, for registering them as subscribers of a virtual private network. In this way, the invention adds to the subscriber data set of the already existing data base, which contains a first data set for accessing the mobile-radio network as such, a further data set which enables the access to a virtual private network. Essentially only steps need to be taken in the mobile-radio network software area, whereby the installation of one or even several virtual private networks can very easily be accomplished.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
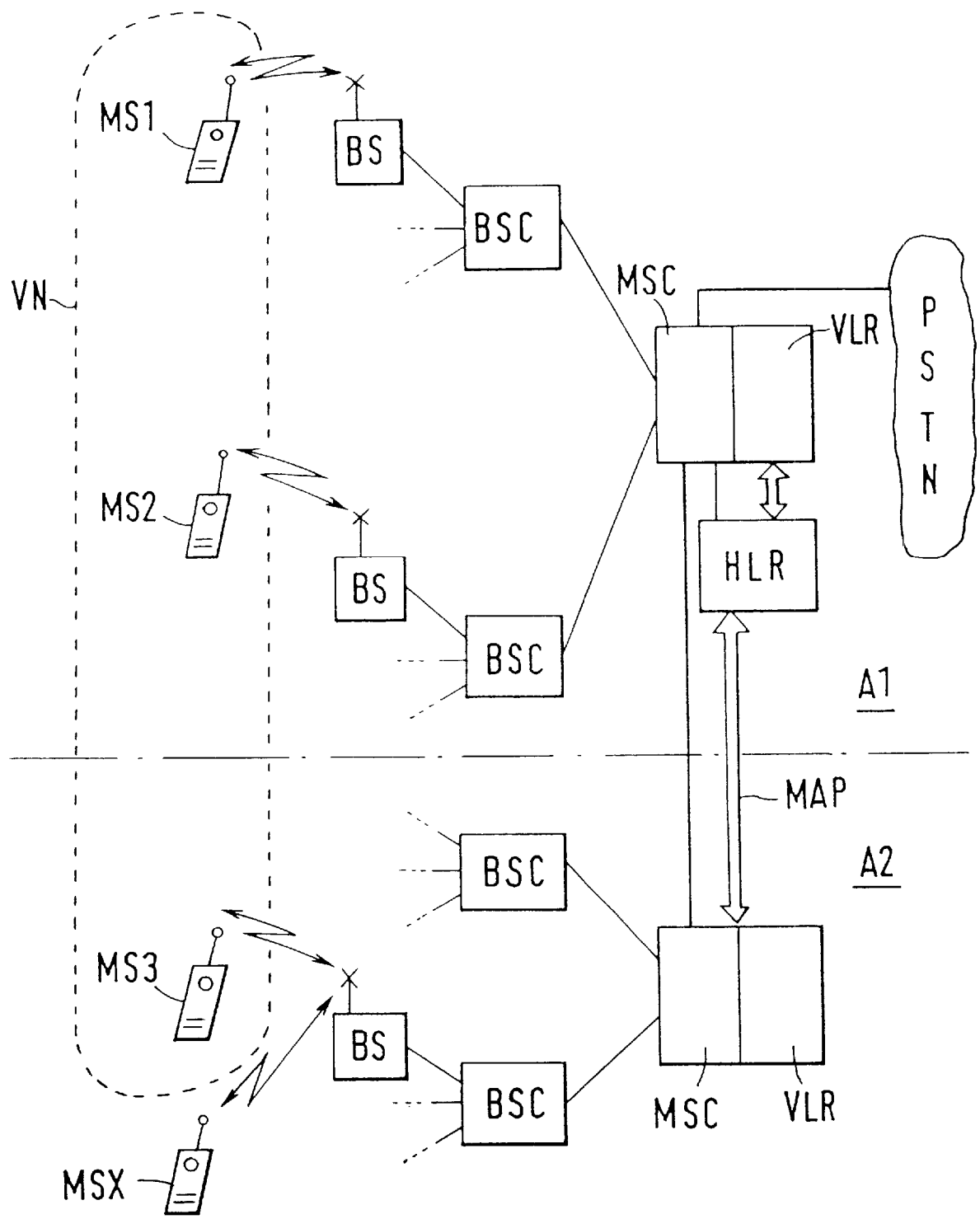
FIG. 1 schematically illustrates a mobile-radio network according to the invention.

FIG. 1 schematically illustrates the structure of a mobile-radio network MRN, within which a virtual private network VN is arranged for a group of mobile subscribers MS1, MS2 and MS3.

The mobile-radio network MRN comprises base stations BS, each of which services a radio cell of the mobile-radio network. Several neighboring radio cells form a radio hop area. To that end the corresponding base stations are connected to a base station control BSC. Several radio hop areas form a mobile switching area. To that effect the corresponding base station controls BSC are connected to a mobile switching center MSC. Several radio hop areas form the mobile-radio network MRN.

For reasons of simplification, FIG. 1 illustrates only two mobile-radio exchange areas A1 and A2 with one mobile-radio exchange center MSC in each, one of which is connected to the public telecommunications network PSTN. The mobile-radio exchange center MSC is connected to a data base, hereafter called home location register HLR. Said home location register HLR administers the subscriber data of the mobile subscribers MS1, MS2, MS3 and MS4 who are permanently registered in the mobile-radio exchange areas.

The mobile-radio network MRN illustrated in FIG. 1 is structured in accordance with the Paneuropean mobile-radio standard GSM. To install a private virtual network for the mobile subscribers MS1, MS2 and MS3 illustrated in FIG. 1, the invention makes use of the provided hardware, particularly the home location register HLR, and the existing network software, particularly the GSM protocol MAP from the so-called mobile application part (see GSM specification 09.02).

This installs the private virtual network without the need to implement an IN (Intelligent Network) structure by means of further hardware. According to the invention, this IN structure is already simulated in a simple and cost-effective manner by the existing structure, which is further described in the following with the aid of FIG. 2.

Figure 2:
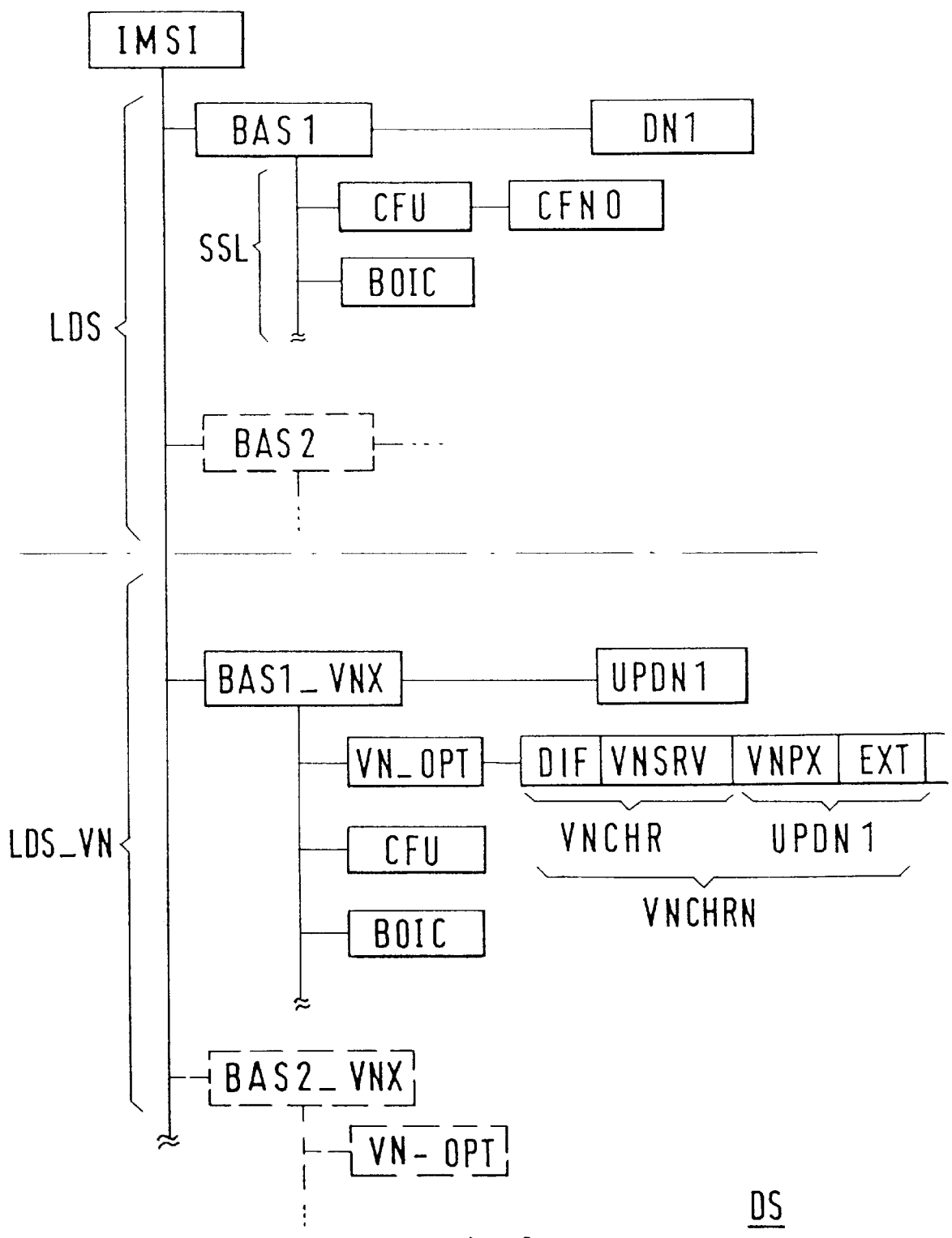
FIG. 2 illustrates the structure of the subscriber data sets stored in the data base.

FIG. 2 schematically illustrates the logic data structure of all subscriber data assigned to a mobile subscriber of the private virtual network, in this instance mobile subscriber MS3. The subscriber data are administered by the home location register HLR and can be used to establish calls.

As illustrated in FIG. 2, the subscriber data contain a mobile subscriber identity number IMSI, which in this instance is assigned to mobile subscriber MS3. This mobile subscriber identity number, called ID number in the following, is stored both on the authorization card (the so-called smart card) and in the home location register HLR. According to the invention, a subscriber data set DS with a first logic data set LDS and a second logic data set LDS-VN is assigned to the ID number. Each of these logic data sets identifies the service profile of at least one basic service BAS1, BAS2, BAS1-VNX or BAS2-VNX. These basic services can include telephone and telefax service. In this instance, the telephone service for the mobile-radio network MRN is designated BAS1, that for the private virtual network VN is designated BAS1-VNX where "X" indicates that several virtual networks VNX can be installed with the structure illustrated in FIG. 2. The designations BAS2 and BAS2-VNX were chosen for telefax services within the different networks. All logic data sets have the same structure and are adapted to the CSM protocol.

The first logic data set LDS in the subscriber data set DS is always used if the mobile subscriber MS3 registers as a subscriber of the entire mobile-radio network, which means as a conventional mobile subscriber. A service list SSL, a so-called supplementary services list contained in each logic data set identifies all those services, in addition to the basic service (e.g. telephone service BAS1 in this instance), to which the mobile subscriber MS3 has access. Such services can be call forwarding CFU with a reference to another subscriber station which is provided by the mobile subscriber through a subscriber station number CFNO, or call blocking BOIC for all outgoing international calls. Each service is identified by its service code, CFU or BOIC in this instance.

The second logic data set LDS-VN also contains a service list, but it includes a service code VN-OPT which indicates whether or not the mobile subscriber MS3 is registered in the virtual private network. The structure of said service code VN-OPT is comparable to service code CFU and also refers to a subscriber station. However, said subscriber station is identified by a subscriber station number UPDN1, which is assigned to the mobile subscriber MS3 himself as a subscriber of the private network. Said subscriber station is physically identical to the subscriber station carrying the number DN1 within the mobile-radio network. Thus both subscriber stations UPDN1 and DN1 terminate at one and the same mobile-radio facility, the only difference is their logic assignment to the public or virtual private network.

Logic data sets such as illustrated in FIG. 2 are installed for each mobile subscriber who also wishes to be registered as a subscriber of the private network.

Since the assignment of each of said mobile subscribers to the public or private network causes no physical change in the existing network structure, the private network must be viewed as a virtual network which is structured in accordance with the physical network structure of the mobile-radio network.

The structure of this private network requires little effort, since not only are the already existing physical network structures utilized, but also the already existing logic network structures, such as for instance the above-cited MAP protocol and the radio interface protocol. Similar to the above-described installation of the additional logic data set LDS-VN for the private network, several additional data sets can also be installed for different private networks. The data set containing the input "active" in the service code VN-OPT indicates to which of the private networks the mobile subscriber is assigned. If none of the additional data sets contains such an input, the mobile subscriber is registered in the public mobile-radio network.

In the following, the registration of the mobile subscriber and the establishment of the call are described for an incoming and an outgoing call (mobile originating call or mobile terminating call).

The mobile-radio network illustrated in FIG. 1 begins with a virtual private network comprising two radio exchange areas A1 and A2 with one radio exchange facility MSC each, with base station controls BSC and base stations BS connected thereto. The first radio exchange area Al is a so-called low-cost area, where low fees are charged for calls by subscribers MS1 and MS2 of the private network. The second radio exchange area A2 is a so-called high-cost area, where higher fees are charged. Each mobile subscriber located in one of these areas is registered in a temporary data base, the so-called visitor data base, either as subscriber MSX of the mobile-radio network MRN as such, or as subscriber MS1 to MS3 of the private network VN. In the example in FIG. 2, the mobile subscriber MS3 is located in visitor area A2. If this mobile subscriber MS3 activates his mobile-radio terminal, the ID number stored on the authorization card, the so-called international mobile subscriber identity number with the above-cited MAP protocol is transmitted by the radio exchange facility of his area A2 to the radio exchange facility and the home location register HLR of the other area A1.

This ID number IMSI is the key to the subscriber data set DS. The home location register HLR now determines whether, in addition to the one logic data set LDS, the mobile subscriber MS3 is also assigned at least one logic data set LDS-VN which identifies him as a subscriber of a private network. As already described earlier, each private network corresponds to a virtual private branch exchange having its own call number directory assigned to it.

If at least a second logic data set LDS-VN is entered in the home location register, the mobile subscriber MS3 receives a brief message inquiring whether he wishes to be registered as a subscriber of one of the private networks or as a subscriber of the public mobile-radio network.

With the input of a registration command for the service VN-OPT and the input of the branch extension number VNPX, the home location register HLR receives the essential data for checking the access authorization. Comparing the branch extension number VNPX with those stored in the home location register HLR under the ID number IMSI of the mobile subscriber indicates which of the virtual private networks he may access. In this instance the mobile subscriber MS3 can only access a single one, namely the private network VN.

By entering a flag bit into the VN-OPT datum, the home location register HLR activates the logic data set LDS-VN and transmits said data set as an active subscriber data set DS to the visitor data bases VLR for temporary storage therein. If no such number is stored in the home location register HLR for the mobile subscriber MS3, no virtual network can be selected, and the mobile subscriber MS3 is then registered in the mobile-radio network MRN.

In this case the mobile subscriber MS3 is registered as a subscriber of the virtual private network VN. In the private network, subscriber MS3 is now able to quickly and simply call the other subscribers MS1 and MS2 of his network by dialing extension numbers. He himself can be reached in the private network VN by dialing his extension number EXT. In this case, the fees for calls in the network which do not go beyond area A1 are charged for example at a flat basic monthly rate.

Other calls are subject to comparable tariff rates of those charged by the public mobile-radio network.

A call activated by subscriber MS3 is structured as follows: First, a number analysis in the visitor data base VLR is performed by means of the data field DIF belonging to the number VNCHRN. Said data field DIF can contain inputs entered by subscriber MS3, such as a network exclusion code number (e.g. "0" or "9") and a control symbol (e.g. "^") for input of a command. If the data field DIF does not contain any such inputs, the visitor data base VLR accesses the call number directory of the virtual private network VN. In this way a number entered by subscriber MS3 is logged as an extension number, or as an abbreviated address dialing number, and converted by the call number directory into a subscriber number UPDN* that is adapted to the mobile-radio protocol MAP. Said subscriber number contains the branch extension number VNPX and the extension number EXT* of the desired subscriber MS*. It is sent by the visitor data base VLR via the MAP protocol to the home location register HLR, where a reference list indicates the ID number IMSI* of the desired subscriber MS*. The call is connected by paging this ID number.

An incoming call from the mobile-radio network MRN or the public telephone network PSTN to the mobile subscriber MS3 would normally lead to an evaluation, carried out by the home location register HLR, of a subscriber data set to which only one logic data set is assigned. This would automatically activate the services entered into the data set LDS in accordance with the example in FIG. 2, and the call would be switched to one of the subscriber stations identified in the CFU data field.

In this case however, when a desired call arrives, the home location register HLR is first checked to see whether the desired mobile subscriber MS3 is desired as a subscriber of the mobile-radio network (call number DN1) or as a subscriber of the virtual private network (call number UPDN1). If the call number UPDN1 is dialed, the home location register HLR furthermore checks whether a logic data set LDS-VN with such a call number exists and is active, meaning whether the service code VN-OPT has the input "active". If this is so, the subscriber MS3 is called by means of his ID number IMSI and by control of the visitor data base VLR (paging). Since the mobile subscriber MS3 is registered as a subscriber of the virtual private network VPN, the incoming calls go directly to the mobile-radio terminal of mobile subscriber MS3, where calls within the virtual private network VN are recognized as such and are charged for at the lower rates than calls activated from outside of the virtual private network VN.

If the data field VN-OPT is not active, the home location register HLR evaluates the data field VNSRV which refers to services for the subscriber MS3 within the private network VN. To that effect. pointers are entered into the data field VNSRV, which point to services in the list of services of the logic data set LDS-VN. For example, the data field contains a flag bit which indicates whether the call should be rerouted by means of an evaluation of the CFU data field.

The above configuration example describing the invention concerns a particularly advantageous application. However, the invention is not limited to this application. Rather, numerous configurations of the invention can be envisioned, such as the use in mobile-radio networks designed according to a different standard than the GSM standard. For example, the mobile-radio network "AMPS-D" used in the United States should be mentioned in this instance, which uses a network protocol "IS 41" that is comparable to the MAP protocol.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A mobile-radio network (MRN) comprising
at least one base station (BS),
a plurality of mobile subscriber radio terminals, each including an authorization card containing subscriber-identifying data (IMSI);
a facility (MSC) connected therewith for controlling establishment and release of calls between mobile subscribers (MS1, MS2, MS3, MSX) assigned to the coverage area of the at least one base station (BS), and
a data base (HLR) connected to the facility (MSC),
wherein
the facility is a mobile switching center (MSC);
the data base (HLR) contains, for each of said mobile subscribers (MS1, MS2, MS3, MSX), a first subscriber data set (DS) having a first logic data set (LDS) associated therewith for registering said mobile subscribers as subscribers of the mobile-radio network (MRN),
the subscriber data set (DS) for at least some of said mobile subscribers (MS1, MS2, MS3) has a second logic data set (LDS-VN) associated therewith for registering said at least some of said mobile subscribers as subscribers of a virtual private network (VN) having access to additional services not available to mobile subscribers not designated as virtual private network subscribers;

the data base is a home location register (HLR) which administers the mobile subscribers both as subscribers of the mobile radio network (MRN) and as subscribers of the virtual private network, based upon said subscriber-identifying data, whereby a subscriber can transfer said subscriber-identifying data by removing said authorization card from a first terminal and inserting said authorization card into a second terminal.

2. A facility which is connectable to at least one base station within a mobile-radio network and which controls establishment and release of calls between mobile subscriber terminals assigned to the coverage area of the at least one base station, comprising a data base which contains, for each of said mobile subscribers, a subscriber data set having a first logic data set associated therewith for registering said mobile subscribers as subscribers of the mobile-radio network and having a respective second logic data set associated therewith for each of at least some of said mobile subscribers for registering said at least some of said mobile subscribers as subscribers of a virtual private network having access to additional services not available to mobile subscribers not designated as virtual private network subscribers, the structure of the second logic data set corresponding to the structure of the first logic data set; and wherein the data base is a home location register (HLR) which administers the mobile subscribers both as subscribers of the mobile radio network (MRN) and as subscribers of the virtual private network, based upon identifying data (IMSI) read from an authorization card in each mobile subscriber terminal and transmitted to said at least one base station, whereby a subscriber can transfer said subscriber-identifying data by removing said authorization card from a first terminal and inserting said authorization card into a second terminal.

3. A data base (HLR) connectable within a mobile-radio network (MRN) to a facility (MSC) which is connected to at least one base station (BS) and which controls establishment and release of calls between mobile subscriber terminals (MS1, MS2, MS3, MSX) assigned to the coverage area of the at least one base station (BS), wherein the data base (HLR) contains, for each of said mobile subscribers (MS1, MS2, MS3, MSX), a first subscriber data set (DS) having a first logic data set (LDS) associated therewith for registering said mobile subscribers as subscribers of the mobile-radio network, and the subscriber data set (DS) for at least some of said mobile subscribers (MS1, MS2, MS3) has a second logic data set (LDS-VN) associated therewith for registering them as subscribers of a virtual private network (VN) having access to additional services not available to mobile subscribers not designated as virtual private network subscribers, the structure of the second logic data set corresponding to the structure of the first logic data set; and wherein the data base is a home location register (HLR) which administers the mobile subscribers both as subscribers of the mobile radio network (MRN) and as subscribers of the virtual private network, based upon identifying data (IMSI) read from an authorization card in each subscriber terminal and transmitted to said base station, whereby a subscriber can transfer said subscriber-identifying data by removing said authorization card from a first terminal and inserting said authorization card into a second terminal.

* * * * *